Aug. 9, 1949.　　　　　G. E. BUSKE　　　　　2,478,858
VIBRATION DAMPENING MOUNTING FOR
OUTBOARD MOTOR HANDLES
Filed Nov. 26, 1945　　　　　　　　　　　　2 Sheets-Sheet 1
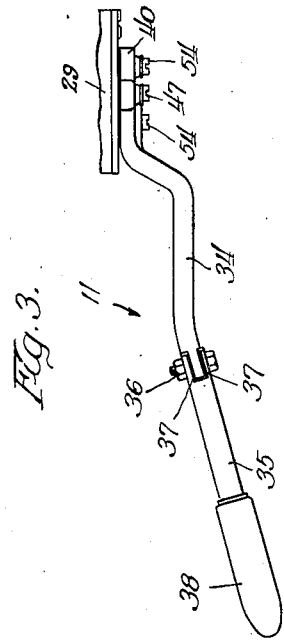
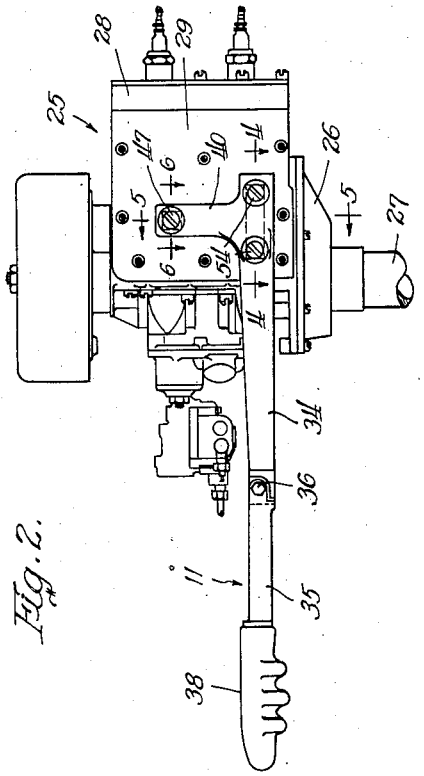
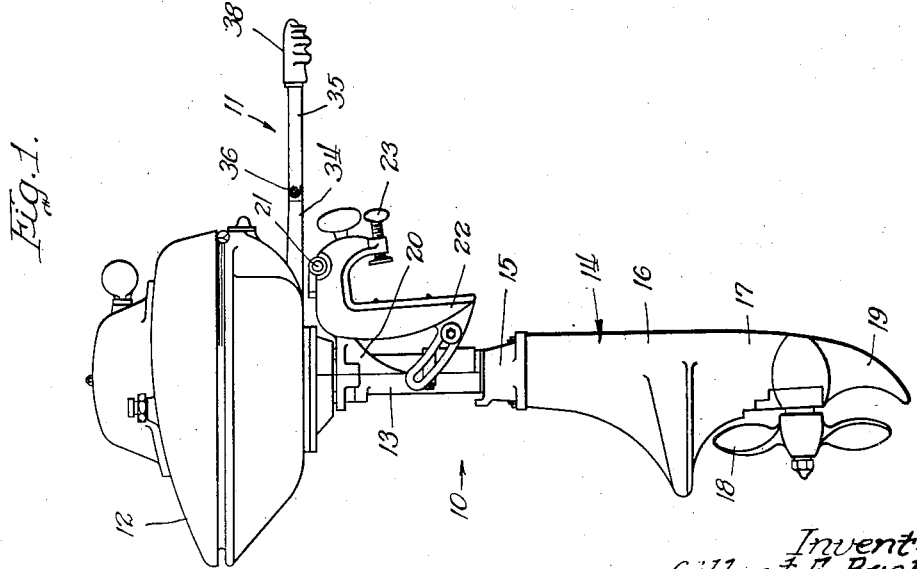
Inventor:
Gilbert E. Buske
By Brown, Jackson, Boettcher & Dienner
Attys.

Aug. 9, 1949.　　　　　G. E. BUSKE　　　　　2,478,858
VIBRATION DAMPENING MOUNTING FOR
OUTBOARD MOTOR HANDLES
Filed Nov. 26, 1945　　　　　　　　　　2 Sheets-Sheet 2
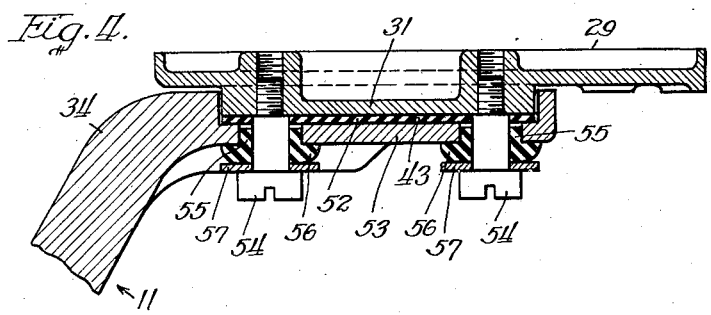
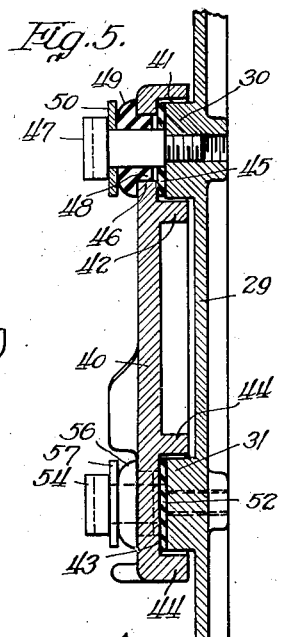
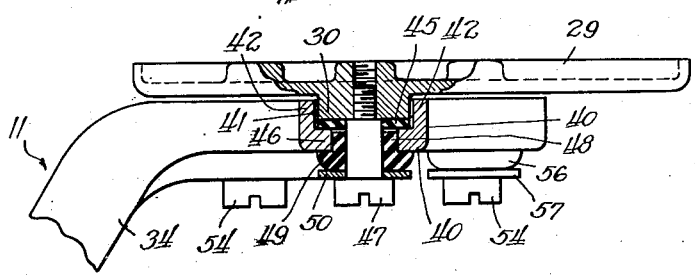
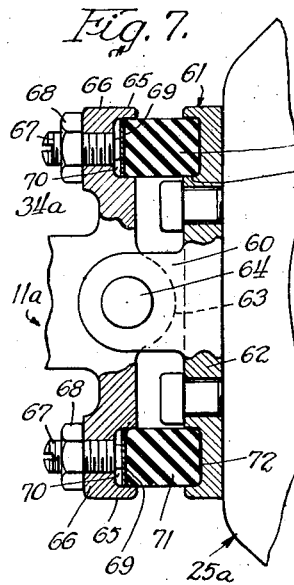
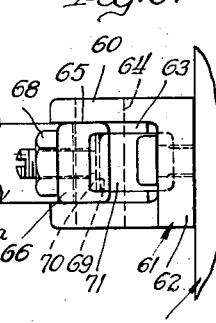
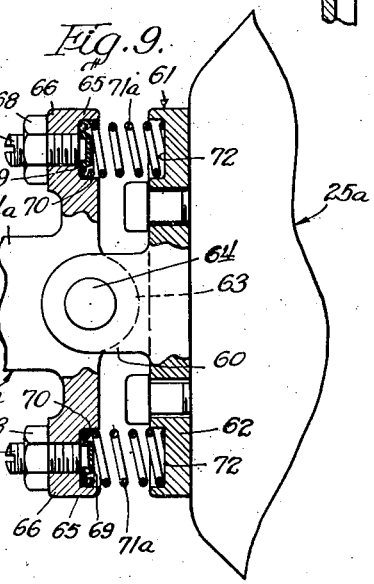
Inventor:
Gilbert E. Buske
By Brown, Jackson, Boettcher & Dienner
Attys.

Patented Aug. 9, 1949

2,478,858

UNITED STATES PATENT OFFICE 2,478,858

VIBRATION DAMPENING MOUNTING FOR OUTBOARD MOTOR HANDLES

Gilbert E. Buske, Anson Township, Chippewa County, Wis., assignor to National Pressure Cooker Company, Eau Claire, Wis., a corporation of Wisconsin Application November 26, 1945, Serial No. 630,930

4 Claims. (Cl. 115—18)

1

This invention relates to outboard motor units, and has to do with the relation between such a unit and its associated steering handle.

Outboard motor units are commonly mounted for tilting movement about a substantially horizontal axis, for raising the unit for clearing obstructions or for other purposes, and for turning movement about a substantially vertical axis, for steering purposes, as is well known. In the operation of the unit considerable vibration, particularly motor torque vibration, is produced. If the steering handle is directly secured to the power head, the vibration incident to operation of the unit is transmitted to the handle. That is objectionable as being both annoying and tiring to the operator, who must hold the handle firmly and continuously for steering purposes. The handle is also used for tilting the unit so as to raise it to clear obstructions, or for other purposes, and should, therefore, be secured to the power head in such manner as not to yield vertically to any appreciable extent, if at all, under downward pressure applied to the handle. For that reason, the usual practice has been to secure the handle rigidly to the power head, even though that results in objectionable transmission of vibration to the handle.

It has been proposed, in order to avoid transmission of vibration to the handle, to mount the handle on the power head by resilient means. But in all of such proposed resilient mountings with which I am familiar, the handle is not effectively restrained against vertical movement relative to the power head and can not be used efficiently for tilting the unit, so that such proposed resilient mountings have proven to be inefficient and unsatisfactory in use. It has also been proposed to attach the steering handle to the power head by a flat leaf spring having its major axis parallel with the steering axis of the unit, the spring being disposed so as to be rigid in a vertical plane, for tilting the unit, and flexible in a horizontal plane for absorbing, to some extent, vibration incident to operation of the unit. In such an arrangement, the leaf spring must be quite stiff and of adequate mechanical strength to withstand the stresses to which it is subjected in tilting the unit, so that its efficiency with respect to absorbing vibration resulting from operation of the unit is quite low.

My invention is directed to an outboard motor unit having a steering handle associated therewith in such manner as to be highly efficient with respect to both tilting of the unit and prevention of transmission of vibration to the handle. To

2 that end, the steering handle is mounted on the unit by means providing substantially unyielding connection therebetween for tilting the unit about its horizontal pivot axis while assuring that substantially all vibration incident to operation of the unit is effectively damped out so as not to be transmitted to the handle. More specifically, the handle is attached to the power head of the unit by means comprising cooperating projections or lugs rigid with the power head and the handle and elastic cushion means, the parts being so related that the projections or lugs provide substantialy unyielding engagement between the handle and the power head for tilting the latter and the cushion means is effective for damping out or absorbing substantially all of the vibration incident to operation of the unit, thereby preventing transmission of such vibration to any objectionable extent to the steering handle. Further objects and advantages of my invention will appear from the detail description.

In the drawings:

Figure 1 is a side view of an outboard motor unit and its associated steering handle, embodying my invention;

Figure 2 is a side view, on an enlarged scale, of the power head and its appurtenances and adjacent parts of the unit and its associated steering handle of Figure 1, the housing for the power head being omitted for clearness of illustration;

Figure 3 is a plan view of the steering handle of Figure 2 mounted on the exhaust manifold cover plate of the power head;

Figure 4 is a sectional view, on an enlarged scale, taken substantially on line 4—4 of Figure 2, certain parts being shown in elevation;

Figure 5 is a sectional view, on an enlarged scale, taken substantially on line 5—5 of Figure 2, certain parts being shown in elevation;

Figure 6 is a sectional view, on an enlarged scale, taken substantially on line 6—6 of Figure 2, certain parts being shown in elevation;

Figure 7 is a plan view of the power head of an outboard motor unit and an associated steering handle, showing a modified form of my invention, the handle being broken away in major portion and the power head being shown semidiagrammatically and fragmentarily, certain other parts being broken away and shown in section;

Figure 8 is a side view of the power head and handle and associated parts of Figure 7, the handle being broken away in major portion and the power head being shown semidiagrammatically and fragmentarily; and Figure 9 is a view similar to Figure 7 of a second modified form of my invention.

In Figure 1 I have shown an outboard motor unit 10 having an associated handle 11 attached thereto in accordance with my invention. The unit 10 is provided at the upper end thereof with a power head enclosed within a streamlined housing 12, this housing carrying a fuel supply tank, the power head being mounted on the upper end of a motor support tube mounted for turning movement about a substantially vertical axis through a tubular housing 13, for steering purposes. An underwater unit 14 is bolted or otherwise suitably secured to a fitting 15 fixed on the lower end of the motor support tube at the lower end of housing 13. The underwater unit 14 comprises an intermediate housing 16 and a lower gear case 17 containing gearing establishing driving connection between the drive shaft of the motor, which shaft extends downward through the motor support tube and the housing 16 into the gear case 17, and the propeller shaft on which the propeller 18 is suitably mounted, gear case 17 being provided with a downwardly extending skeg 19. Housing 13 is provided, at its upper end, with an outwardly extending arm 20 fixed thereto, preferably integral with one section thereof, this housing being conveniently formed in two sections bolted together, which arm is pivotally connected at 21 to a clamping bracket 22, for tilting movement about a substantially horizontal axis. The bracket 22 is of generally C-shape and is provided with clamping screws, one of which is shown at 23, which cooperate with the outer or after arms of bracket 22 for clamping the latter to the sill or transom at the stern of a boat, as is known. It will be seen that when the unit 10 is mounted on a boat, it is tiltable about a substantially horizontal axis and is turnable about a substantially vertical axis, the former for lifting the unit to clear obstructions and for other purposes, and the latter for steering purposes. It will be understood that the unit shown in Figure 1 is by way of illustration only, and that a unit, including the clamping bracket 22, of any other suitable construction and in which the unit is mounted for tilting movement about a substantially horizontal axis and for turning movement about a substantially vertical axis may be used, within the teaching of my invention. In general, the unit so far described may be considered as of known type with respect to its mounting for tilting and turning movement.

In Figure 2 I have shown the power head, indicated in its entirety by the reference number 25, as secured, by bolting or in any other suitable manner, to a flanged member 26 secured on the upper end of the motor support tube 27 previously referred to. The power head 25 comprises a two cylinder internal combusion engine or motor 28 of suitable type having secured to one side thereof, conveniently by bolting, an exhaust manifold cover plate 29. This cover plate 29 has secured thereto and projecting outward therefrom, conveniently by being formed integral therewith, an upper substantially cubiform boss 30, best shown in Figures 5 and 6, and a lower boss 31 of rectangular cross section and of substantially oblong shape at its outer face. These bosses 30 and 31 provide means for attaching the steering handle 11 to cover plate 29, as will be explained more fully presently. The handle 11 is, in general, of known construction and comprises an after section 34 and a forward section 35 hinged together by bolt and nut means 36, the adjacent ends of the sections 34 and 35 being suitably shouldered to limit relative downward movement of section 35 to its position extending in alignment with section 34, as shown in Figure 2. The hinge connection between the sections 34 and 35 includes fiber washers 37 providing a friction lock for holding section 35 in desired angular relation to section 34, the bolt and nut means 36 being drawn up sufficiently tightly to render such friction lock effective, as will be understood. The handle section 35 preferably is provided at its forward end with a rubber grip 38 formed as shown, as is known.

Handle section 34 is formed at its after end portion with an upwardly extending arm 40 provided at its upper end portion with a socket 41 opening toward cover plate 29 and substantially enclosing boss 30. The cross area of socket 41 is slightly greater than the cross area of boss 30 so that the walls of the latter are disposed in proximity to but spaced a short distance from the sides of boss 30, flanges 42 of arm 40 being disposed a short distance from the front and the back faces of boss 30, as will be clear from Figure 6. Section 34 of steering arm 11 is provided with a socket 43 also opening toward cover plate 29 and substantially enclosing boss 31, socket 43 being of slightly greater width and length than boss 31 so that the walls of this socket normally are spaced a short distance away from the top and bottom and the end walls of boss 31, the top and bottom flanges 44 of socket 43 normally being in proximity to but spaced a slight distance outward from the top and bottom faces of boss 31.

An elastic cushion member 45, substantially conforming to the outer end or face of boss 30, is disposed between this boss and outer wall 46 of socket 41. A shouldered mounting screw 47 passes through wall 46 and cushion member 45, this screw threading into boss 30. The opening through wall 46, which accommodates screw 47, is of materially greater diameter than the body of this screw and receives a grommet 48, of elastic material, having at its outer end an outwardly extending circumferential flange 49 confined between wall 46 and the head of screw 47, with an intervening washer 50. The grommet 48 also is formed of elastic material, conveniently rubber, either natural or synthetic, grommet 48 and cushion member 45 preferably being formed of "Neoprene." A cushion member 52, substantially conforming to the outer face of boss 31, is disposed between this boss and outer wall 53 of socket 43. Two headed and shouldered screws 54 pass through wall 53 and screw into boss 31 adjacent the ends thereof, these screws passing through cushion member 52 and through grommets 55 disposed about these screws and fitting through openings in wall 53, each of these grommets having at its outer end an outwardly extending circumferential flange 56 confined between the outer face of wall 53 and a washer 57 abutting the inner face of the head of screw 54. The cushion member 52 and the grommets 55 are also formed of elastic material, preferably "Neoprene." The bodies of the mounting screws 47 and 54 are of such length that the grommets and the cushion members associated therewith and with the bosses 30 and 31 are maintained under sufficient pressure to hold the parts firmly in position without, however, subjecting either the grommets or the cushion members to objectionably high pressure such as would tend to reduce the resiliency or elasticity of the grommets and the cushion members.

Under ordinary conditions, the outer or after end portion of section 34 of steering arm 11 is held in such position, by the rubber grommets and associated parts, that the walls of the sockets 41 and 43 are held spaced from the bosses 30 and 31, respectively, so that there is no metal-to-metal contact between either of these bosses and handle section 34. The rubber cushion members and the rubber grommets, due to their resiliency or elasticity, are then highly effective for damping vibration incident to operation of the outboard motor unit, and thus effectively prevent transmission of such vibration to any appreciable or objectionable extent to the steering handle. The handle 11 may, therefore, be used in the ordinary manner for steering purposes without the operator being subjected to vibration incident to operation of the unit. When it is desired to tilt the unit about the horizontal axis 21, so as to raise it to clear obstructions or for other purposes, downward pressure is applied to the handle section 35, with the latter in its position shown in Figure 2. That causes slight vertical movement of handle 11 relative to the power head 25, this handle swinging in counterclockwise direction as viewed in Figure 2, until the rearward flange 42 of socket 41 and the upper flange 44 of socket 43 contact the rearward face and the upper face of bosses 30 and 31, respectively. As will be understood, during such movement of the handle 11, the grommets 48 and 55 are slightly distorted, as required, and contact of the flanges with the bosses provides a positive and unyielding connection between the handle and the power head which may then readily be tilted about axis 21, by means of the handle, without subjecting the grommets to further distortion or pressure. The cushion members 45 and 52 are effective at all times for holding the after portion of section 34 of handle 11 spaced from plate 29 so that, when the handle is used for steering, there is no metal to contact between the handle and parts of the power head. I thus assure a positive operating connection between the power head and the steering handle for the purpose of tilting the unit about its substantially horizontal pivot axis, while also providing a highly efficient yielding or cushioned connection between the handle and the power head for turning the unit about its steering axis and maintaining it in desired adjustment about such axis, the latter connection serving effectively to prevent transmission to steering handle 11 of vibration incident to operation of the unit.

In the modification shown in Figures 7 and 8, power head 25a is provided at the forward end thereof with two vertically spaced ears 60 rigid with the power heads, the ears being either integral with a part of the power head or with a suitable bracket 61 bolted or otherwise suitably secured to the power head. The bracket 61 comprises a base 62 extending beyond the ears 60 at opposite sides thereof. Section 34a of steering arm 11a is provided, at its outer or after end, with a projection in the form of an eye 63 which fits snugly between ears 60 and is pivoted thereto, on a vertical axis, by a pivot pin 64. The steering arm 11a is thus mounted to turn about a vertical axis, which is parallel with the steering axis of the motor unit.

Section 34a of arm 11a is provided, at its outer or after end, with two arms 65 extending from opposite sides thereof substantially at right angles thereto. Each of the arms 65 is provided, adjacent its outer end, with a boss 66 suitably tapped and threaded for reception of a screw 67 adjustably secured in position by an associated lock nut 68. Each of the screws 67 bears, at its inner end, on a follower 69 slidable in a socket 70 in boss 66, opening toward base 62 of bracket 61; socket 70 also receiving the outer end portion of an elastic cushion member 71 seating at it sinner end portion in a socket 72 in base 62 of bracket 61. The cushion members 71 are formed of a suitable elastic material, such as rubber, either natural or synthetic, preferably "Neoprene."

It will be seen that the handle 11a is pivoted on an axis parallel with the steering axis of the unit, and that the ears 60 and the portion of the steering handle fitting therebetween provide a positive and substantially unyielding connection between the steering handle and the unit for tilting the latter about its horizontal pivot axis. Since the principal vibration of the unit, incident to operation thereof, is motor torque vibration tending to turn the unit about the steering axis, no appreciable vibration is transmitted to the steering handle through the pivot connection between the same and the power head, and the cushion members 71 effectively absorb vibration of the power head itself while providing operation connection thereof to the steering handle for steering purposes. In that manner, the arrangement of Figures 7 and 8 effectively prevents objectionable transmission of vibration to the steering handle. Obviously, the ears 60 may be formed integral with the power head 25a, as above noted, in which case the cushion members 71 would seat, at their inner end portions, in or against areas of a part of the power head itself instead of in the base 62 of bracket 61.

The modification shown in Figure 9 is similar to that of Figures 7 and 8 except that coil compression springs 71a have been substituted for the cushion members 71 of rubber or like material. The operation of the form of Fig. 9 will be clear from what has been stated with respect to Figures 7 and 8, and need not be described in greater detail. In Figures 7 to 9, inclusive, the steering handle is shown, by way of example, as attached to the power head of the unit at the forward or front portion thereof. That is not essential to my invention, however, and it will be understood that by suitably forming the rearward or after end portion of the steeling handle it may be attached to the power head at one side thereof or in any other suitable location.

As above indicated, and as will be understood by those familiar with this art, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In an outboard motor unit tiltable about a substantially horizontal axis and turnable about a substantially vertical steering axis, a power head having spaced apart bosses rigid therewith at one side thereof adjacent the steering axis, a steering handle having portions extending about said bosses providing elements extending alongside thereof in proximity thereto normally spaced therefrom, and means yieldingly mounting said handle on said bosses effective for normally holding said elements spaced from said bosses and for substantially absorbing vibration incident to operation of said unit while permitting vertical movement of said handle for moving said elements thereof into contact with said bosses.

2. In an outboard motor unit tiltable about a substantially horizontal axis and turnable about a substantially vertical steering axis, a power head having at one side thereof adjacent the steering axis an upper boss and a lower boss, a steering handle having socketed portions extending about said bosses providing flange elements extending alongside thereof in proximity thereto normally spaced therefrom, mounting screws passing through said socketed portions of said handle secured in said bosses, and elastic cushion members interposed between said bosses and said socket portions and said screws effective for substantially absorbing vibration incident to operation of said unit while permitting vertical movement of said handle relative to said head for moving said flange elements into contact with said bosses.

3. In an outboard motor unit tiltable about a substantially horizontal axis and turnable about a substantially vertical steering axis, a power head having at one side thereof adjacent the steering axis an upper boss and a substantially oblong lower boss, a steering handle having at its outer end socket portions extending about said bosses providing flange elements disposed adjacent the sides of said upper boss normally spaced therefrom and flange elements disposed adjacent the top and the bottom of said lower boss normally spaced therefrom, elastic cushion members interposed between the outer faces of said bosses and the outer walls of said socket portions, mounting screws passing through the outer walls of said socket portions and secured to said bosses, and elastic cushion members interposed between said screws and the outer walls of said socket portions, said cushion members substantially absorbing vibration incident to operation of said unit while permitting vertical movement of said handle relative to said head for moving said flange elements into contact with said bosses.

4. In an outboard motor unit tiltable about a substantially horizontal axis and turnable about a substantially vertical steering axis, a power head, a manifold cover plate fixed to said power head at one side thereof, an upper boss and a lower boss rigid with said plate, a steering handle of approximately T shape at its after end portion and there having elements rigid therewith disposed above and below one of said bosses in proximity thereto but normally spaced therefrom, said handle also having at its after end portion elements rigid therewith disposed at opposite sides of the other boss in proximity thereto but normally spaced therefrom, and means mounting said after end portion of said handle on said plate comprising cushion means effective in a horizontal plane, whereby said elements of said handle have substantially unyielding engagement with said bosses for tilting said unit about said horizontal axis and yielding connection to said plate for turning said unit about said steering axis effective for substantially absorbing vibration incident to operation of said unit.

GILBERT E. BUSKE.

REFERENCES CITED

The following references are of record in the file of this patent:

UNITED STATES PATENTS

| Number | Name | Date |
| --- | --- | --- |
| 1,305,688 | Burke | June 3, 1919 |
| 1,689,032 | Johnson | Oct. 23, 1928 |
| 1,859,038 | Irgens | May 17, 1932 |
| 1,932,785 | Irgens | Oct. 31, 1933 |
| 1,999,694 | Irgens | Apr. 30, 1935 |
| 2,041,704 | Gordon et al. | May 26, 1936 |
| 2,052,636 | Lesage | Sept. 1, 1936 |
| 2,127,744 | Linthwaite | Aug. 23, 1938 |
| 2,209,592 | Beck | July 30, 1940 |